UNITED STATES PATENT OFFICE.

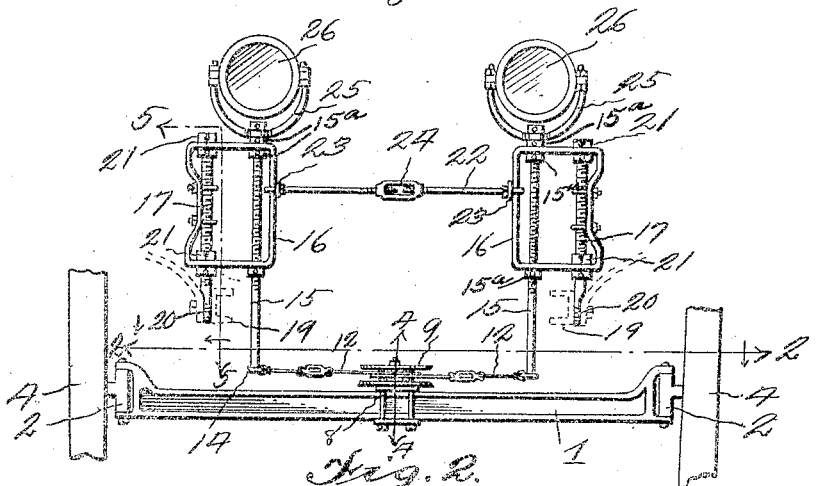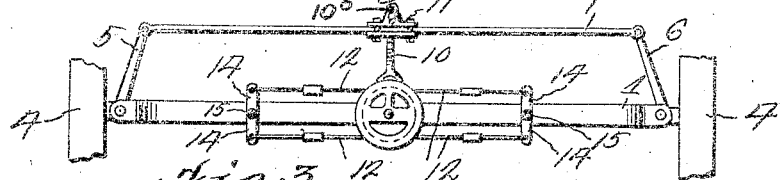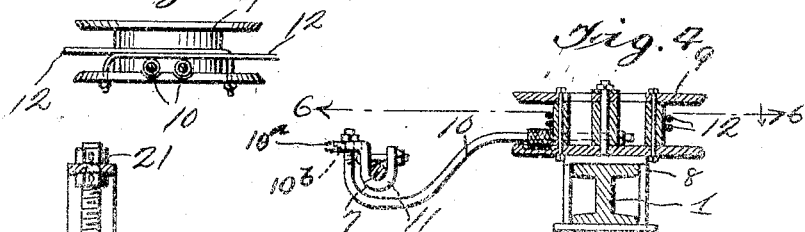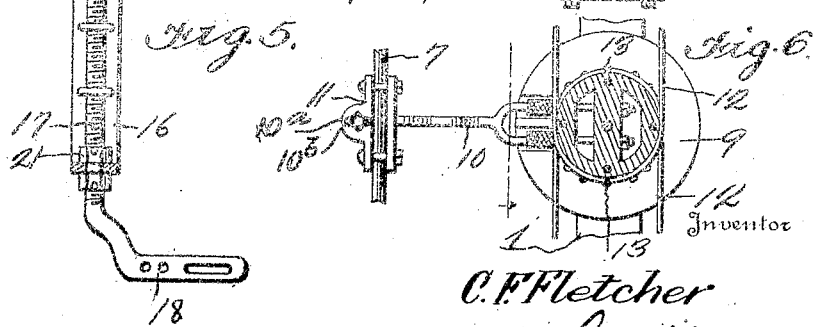

CHARLIE FRED FLETCHER, OF FARMINGTON, WEST VIRGINIA.

DIRIGIBLE HEADLIGHT FOR VEHICLES.

392,488.     Specification of Letters Patent.     Patented Oct. 4, 1921.

Application filed March 11, 1921. Serial No. 451,501.

*To all whom it may concern:*

Be it known that CHARLIE F. FLETCHER, citizen of the United States, residing at Farmington, in the county of Marion and State of West Virginia, has invented certain new and useful Improvements in Dirigible Headlights for Vehicles, of which the following is a specification.

The invention relates to dirigible headlights for vehicles and has for its object to provide a mechanism of this character which may be easily and quickly applied to a conventional form of motor driven vehicle and so constructed that when the connecting rod between the spindle arms is moved a cable drum pivoted on the front axle will also move and impart pulls on cables, which cables are connected to arms of vertically disposed lamp posts and thereby move the lamps carried by the posts so that they will reflect the light from the lamps on the road in front of the vehicle when said vehicle is turning to the right or left.

A further object is to pivot the lamp posts in brackets, which brackets are vertically adjustable on shafts carried by the frame of the vehicle and to provide a connecting rod between tl lamp post brackets for holding and bracing said brackets, said connecting rod being provided with a turn buckle by means of which it may be tightened or loosened as desired.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of a front axle of an automobile showing the dirigible light mechanism applied thereto.

Fig. 2 is a horizontal sectional view taken on line 2—2 of Fig. 1.

Fig. 3 is an enlarged side elevation of the cable drum.

Fig. 4 is a vertical sectional view taken on line 4—4 of Fig. 1.

Fig. 5 is a vertical sectional view taken on line 5—5 of Fig. 1.

Fig. 6 is a horizontal sectional view taken on line 6—6 of Fig. 4.

Referring to the drawings, the numeral 1 designates a conventional form of front axle of a motor driven vehicle and 2 the pivoted knuckle carried thereby on the spindles of which the front wheels 4 of the automobile are mounted. Extending rearwardly from the knuckles 2 are arms 5 and 6, which arms are connected together by connecting rod 7, said connecting rod 7 being moved in the usual manner by steering mechanism not shown. Pivotally mounted on a bracket 8 carried by the axle 1 is a horizontally disposed cable drum 9, which cable drum is provided with a rearwardly, downwardly and upwardly extending arm 10, which arm has its upper end disposed in an elongated slot 10ª of the horizontal portion 10ᵇ of a clamp 11 carried by the connecting rod 7, said clamp forming means whereby as the connecting rod 7 is moved from side to side during a steering operation, the cable drum 9 will be rocked. Extending around the cable drum 9 and having their ends extending in opposite direction are cables 12 which cables are anchored to the drum as at 13 and have their ends connected to the ends of opposite extending arms 14 carried by the lower ends of vertically disposed lamp posts 15. The lamp posts 15 are pivotally mounted in rectangular shaped brackets 16 and held against vertical movement by collars 15ª. The brackets are supported by threaded shafts 17, the lower ends of which terminate in right angle portions 18 which are adapted to be secured to the sides of the vehicle frame 19 at 20. By threading the shafts 17 nuts 21 may be utilized for holding the bracket 16 from pivotal action thereon. However as a further brace for said bracket 16, the brace rod 22 is provided, which rod has its ends connected at 23 to the bracket 16 and is provided with a centrally disposed turn buckle 24, by means of which the brackets 16 may be adjusted in relation to each other and the bracing of the bracket 16 varied. The upper ends of the lamp posts 15 are provided with conventional forms of lamp brackets 25 in which are secured lamps 26.

It will be seen that when the connecting rod 7 is moved in either direction, that the drum 9 will be rocked and consequently the diagonally disposed arms 14 of the lamp post 15 will be rocked in opposite directions by the cables 12, which action will cause the pivotal movement of the lamp posts 15 and consequently a movement of the lamps 26. The lamps 26 move in the direction of the movement of the vehicle wheel during a steering operation and consequently the light from said lamps will be reflected on the road, ahead of the vehicle when said vehicle is making a turn to the right or left, or is going straight ahead, thereby preventing accident and giving the operator a clear view of the road bed ahead of him at all times. It will also be seen that the construction is simple and so designed that it may be easily and quickly applied to any form of motor driven vehicle.

The invention having been set forth what is claimed as new and useful is:—

The combination with a front axle of a motor driven vehicle having wheels pivoted at the ends thereof and controllable by a transversely disposed rod located behind said axle, of a dirigible light mechanism for the vehicle, said dirigible light mechanism comprising vertically disposed lamp posts having lamps at their upper ends, the lower ends of said posts terminating above the axle and provided with forwardly and rearwardly extending arms, a horizontally disposed drum pivoted on the axle substantially centrally thereof and between the lamp posts, cables extending around said drum and having their ends connected to the forwardly and rearwardly extending arms, said cables being anchored to the drum, a rearwardly, downwardly and upwardly extending arm carried by the drum, a member clamped to the connecting rod for controlling the wheels carried by the axle, a rearwardly extending plate carried by said connecting rod member, the upper end of the rearwardly, downwardly and upwardly extending arm being disposed in an elongated aperture in the rearwardly extending plate carried by the connecting rod member.

In testimony whereof I affix my signature.

CHARLIE FRED FLETCHER.

Witnesses:
  W. H. DAWSON,
  W. E. MAPEL.